United States Patent [19]
Holden

[11] 4,191,056
[45] Mar. 4, 1980

[54] PRESSURE GAUGE SPRING

[75] Inventor: Edward S. Holden, Cambridge, Mass.

[73] Assignee: Tube Engineers, Inc., Waltham, Mass.

[21] Appl. No.: 937,852

[22] Filed: Aug. 29, 1978

[51] Int. Cl.[2] .............................................. G01L 7/04
[52] U.S. Cl. ...................................... 73/743; 72/367
[58] Field of Search ......................... 73/741, 742, 743; 72/367

[56] References Cited

U.S. PATENT DOCUMENTS

| 1,521,343 | 12/1924 | Townsend | 73/742 |
| 1,714,988 | 5/1929 | Schlaich | 73/743 |
| 2,495,314 | 1/1950 | Caldwell | 73/743 |
| 2,522,780 | 9/1950 | Dickson | 73/742 |
| 3,232,116 | 2/1966 | Perkins | 73/743 |
| 3,382,720 | 5/1968 | Young | 73/743 |

*Primary Examiner*—Donald O. Woodiel

[57] ABSTRACT

A pressure responsive spring element for a gauge is made from cold worked metal.

22 Claims, 7 Drawing Figures

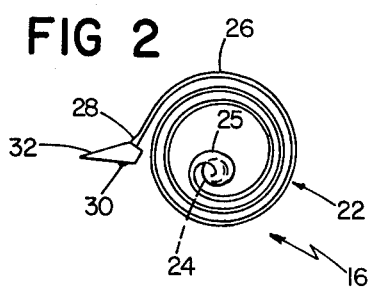
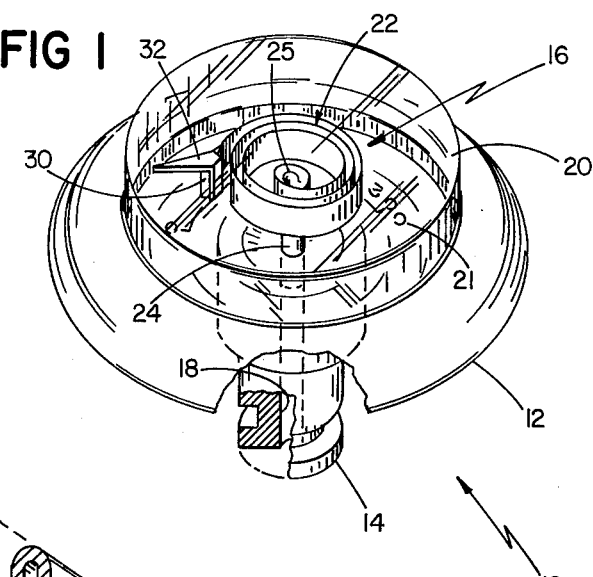
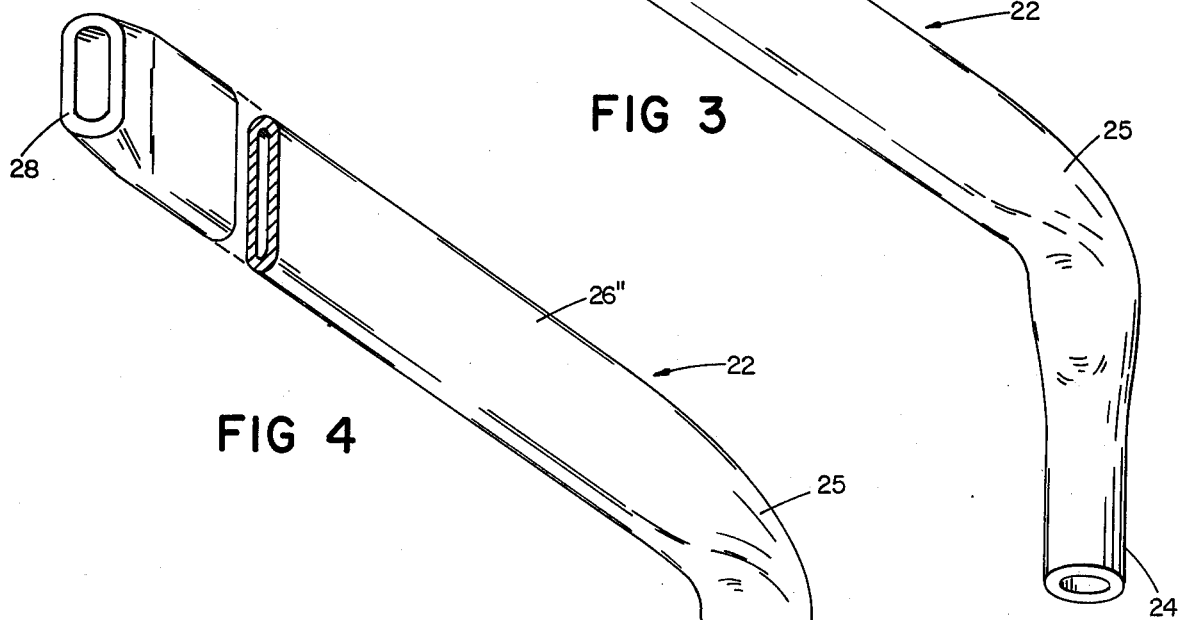
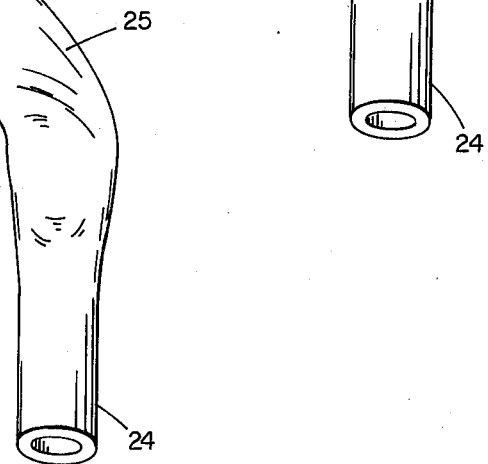

PRESSURE GAUGE SPRING

FIELD OF THE INVENTION

This invention relates to pressure responsive spring elements, and more particularly to spring elements for gauges for measuring pressure or temperature and the like.

BACKGROUND OF THE INVENTION

Inexpensive pressure and temperature gauges are commonly made using spring elements known as Bourdon tubes. A thin-walled metal tube is flattened along its length, but is not completely closed on its inside when so flattened; the flattened tube is formed into a curve and sealed at one end; and the inside of the tube is subjected to a source of pressure applied through its other end. The applied pressure causes the tube to undergo a volumetric change, deflecting the sealed end of the tube a measured amount.

One problem with such springs is that the applied pressure often causes the thin metal walls to split, especially along the sharply folded edges of the flattened tube where the stresses are concentrated. Caldwell U.S. Pat. No. 2,495,314 eliminates the sharply folded edges by positioning a round wire form along each inner edge of the tube, and flattening the tube around the wire to form round edges having relatively large radii of curvature. To further prevent stress concentration at the edges of the tube, Caldwell also shapes his rounded edges into sections having transversely varying wall thickness to provide a theoretically uniform transverse stress distribution. However, Caldwell's complexly shaped spring with its cumbersome wire forms is difficult and costly to fabricate.

Another common problem with Bourdon springs is that the tube permanently deforms under the applied pressure, rendering the gauge inoperative. The problem is particularly acute where the gauge is subjected to cyclical pressure loading, because the thin-walled metal tubes are especially prone to fatigue. One approach to this problem has been to fabricate the tube from a material that can be heat treated to a spring temper, such as beryllium copper alloy. However, there are many very important applications for which such copper alloy springs are useless, because the metal reacts with the pressurized fluid causing the tube to develop leaks (e.g., acetylene torches, fire extinguishers with antifreeze additives) or causing unacceptable contamination (e.g., oxygen cylinders for medical use). For such applications especially, it would be desirable to fabricate the spring from a relatively inert metal, such as stainless steel. However, attempts to produce an inexpensive stainless steel gauge with adequate strength and spring temper have not been successful, because stainless steel is soft and cannot be heat treated to a spring temper.

Another approach to this problem has been to make a gauge with a short spring which has a very small throw or movement when loaded. Short springs are less prone to fatigue, because of the low magnitude of the movement involved. However, complex and costly gearing mechanisms are required to amplify the small movements into readable output.

Perkins U.S. Pat. No. 3,232,116 shows a spring, made from material such as stainless steel, which is provided with welded strengthening ribs to reduce wall stresses. However, such welding is time consuming and expensive.

It would be desirable to provide a pressure responsive spring element having adequate spring temper and resistance to splitting which does not require heat treating or costly fabrication procedures.

SUMMARY OF THE INVENTION

I have discovered that such a spring element can be obtained by cold working the walls of a metal tube to a reduced thickness to thereby increase its yield point and provide it with a spring temper. My spring is easily fabricated by placing the tube in a groove of predetermined width and depth in a hardened flat stock, and cold working the tube by flattening it in the groove.

In preferred embodiments the walls of the tube are cold worked to a reduced thickness on the order of 60 to 80 percent of their original thickness; the tube is thin-walled stainless steel; the tube is type 316 stainless steel 0.003 to 0.0085 inches thick before it is cold worked; the tube has a body portion which is cold worked substantially uniformly; the body portion is flattened transversely and coiled longitudinally forming a helix; and a pointer is connected to a nose portion of the tube by a solder bead which also seals the tube.

My spring is simple, inexpensive, easy to construct, and its provides a reliably accurate pressure or temperature gauge with a broad range of applications.

PREFERRED EMBODIMENT

I turn now to the structure and method of manufacture and operation of the preferred embodiment, first briefly describing the drawings thereof.

DRAWINGS

FIG. 1 is a perspective view, partially broken away, of a pressure gauge having a spring assembly according to the invention.

FIG. 2 is a plan view of the spring assembly of the gauge of FIG. 1.

FIGS. 3 and 4 are enlarged perspective views, partially broken away, of the spring assembly of FIG. 1, shown in intermediate stages of fabrication.

STRUCTURE

Figure 5:
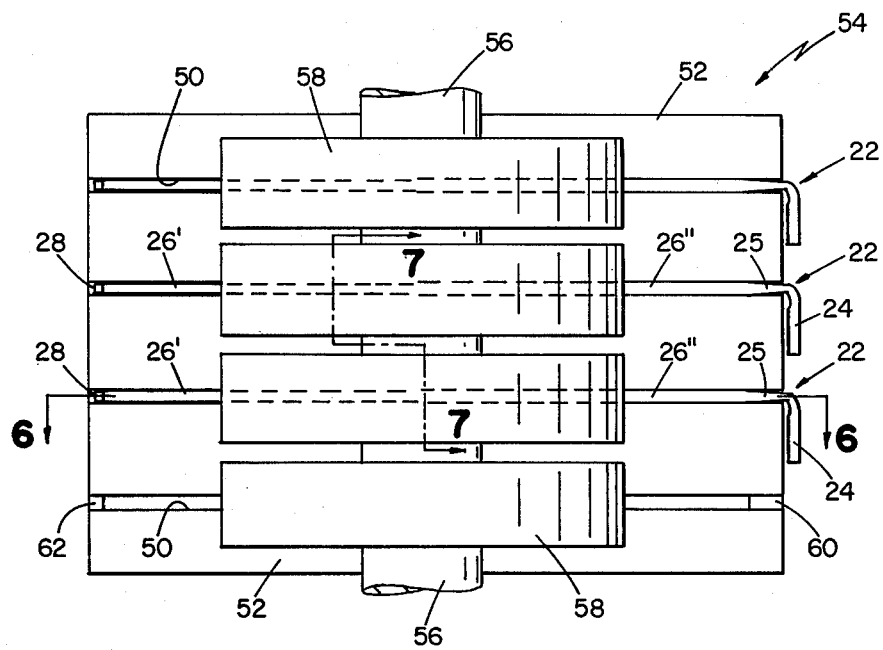
FIG. 5 shows a portion of a rolling machine used to fabricate the element of FIG. 1.

FIG. 1 shows a pressure gauge 10 having a stainless steel base 12, stainless steel pressure fitting 14 with an axially extending bore 18 therethrough mounted in a central hole in the base, a spring assembly 16 connected to the bore in the fitting, and a clear plastic lens 20 secured around its periphery to the base and projecting outwardly therefrom. The face of the base is provided with indicia 21.

Referring to FIGS. 1 and 2, spring assembly 16 comprises a thin-walled stainless steel tube 22 having a neck portion 24 adapted to be sealingly connected in bore 18 of fitting 14, a transition portion 25, a transversely flattened body portion 26 longitudinally coiled in a helix, and a nose portion 28 sealed with a silver solder bead 30. Pointer 32 is attached to nose 28 by solder bead 30.

Manufacture and Operation

FIGS. 3 and 4 show the spring assembly in intermediate stages of construction. First, as shown in FIG. 3, tube 22 is bent at a right angle at transition portion 25 to form a neck portion 24, and is flattened in the conventional way to form a body portion 26' and a nose portion 28. Then, as shown in FIG. 4, tube 22 is cold worked uniformly along its entire body portion 26" to a spring temper. The walls of body portion 26" are reduced in thickness and their yield point is increased.

Figure 6:
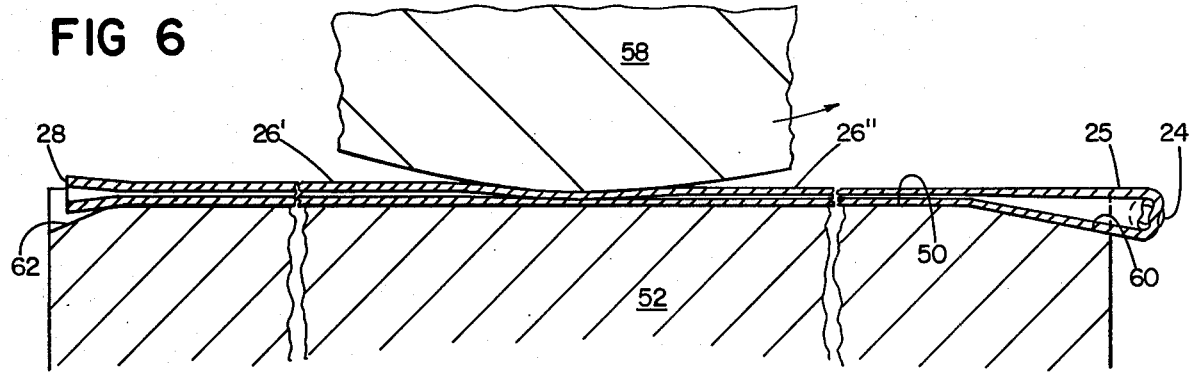
FIG. 6 is a section, partially broken away, through 6—6 of FIG. 5.
Figure 7:
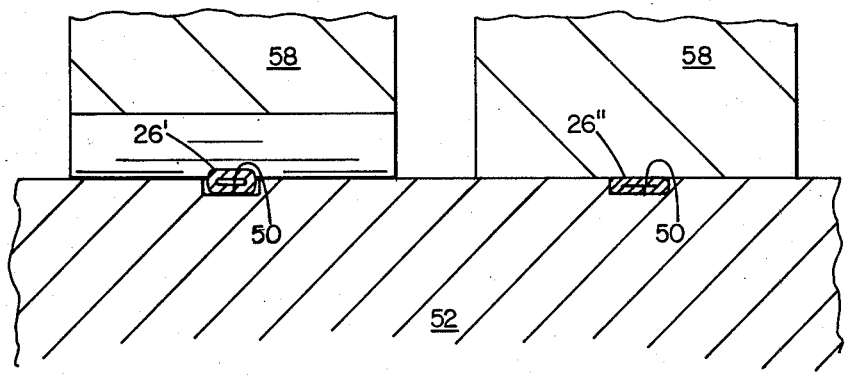
FIG. 7 is a section through 7—7 of FIG. 5.

Referring to FIGS. 5-7, the tubes 22 are cold worked in a rolling machine 54. Grooves 50 are ground in a hardened flat stock 52. Tubes 22 are placed in the grooves 50, and a shaft 56 having bearings 58 mounted thereon is rolled over the surface of the stock 52 pressing the body portion 26' of the tubes into the grooves causing the walls of the tube to be sequeezed to the reduced thickness of body portion 26". As shown in FIGS. 5 and 6 recesses 60 and 62, provided in each groove 50, are adapted to respectively receive transition portion 25 and nose 28 of each tube 22 to prevent them from being squeezed by the roller 58. Advantageously, I have found that while the walls of the body portion 26' are squeezed together as the rollers pass over, they spring back open slightly so that the body portion 26' is not pinched together, but remains hollow so that pressure may be communicated therethrough.

Finally, as shown in FIG. 2; the flattened cold worked body portion 26 is would into a helix. A bead of silver solder 30 is placed in the nose 28 to seal the end of the tube 22, and at the same time to fasten a pointer 32 to the nose.

In operation, fitting 14 is connected to a source of pressure (not shown). The pressure is communicated through bore 18 and neck 24 of tube 22 to body portion 26, the pressure causes the body portion to increase in volume and the helix to unwind, moving the pointer 32 through a measured arc as indicated by indicia 21. Subsequent increases in pressure cause the body portion 26 to unwind further measured amounts. Similarly, subsequent decreases in pressure cause corresponding decreases in the volume of tube 22 and the body portion 26 will wind up a measured amount.

I have made a 300 psig gauge (at a throw of 120 degrees) from a type 316 stainless steel tube (5 inches long×0.06 inches diameter×0.0029 inches wall thickness; 0.06 carbon content) by reducing the wall thickness by approximately 40 percent (to approximately 0.00175 inches—requiring a groove in the flat stock 0.09 inches wide×0.0035 inches deep). The yield point of this spring was increased from 91,700 psig to 152,000 psig.

Alternative Embodiments

Other embodiments are within the scope of the following claims. While I have found that for thin-walled stainless steel tubes, cold working the tube to a 20 to 40 percent reduction in wall thickness provides an adequate spring temper and increase in yield strength, the specific reduction needed for each particular application (and the corresponding geometry of the grooves in the flat stock) is readily determined using known cold working principles. For example, more ductile metals (e.g., stainless steel having lower carbon contents) would require a correspondingly greater amount of cold working. Also tubes having thicker walls reqire correspondingly less cold working [E.g., I have also recently made a 4,000 psig gauge (at a throw of 95 degrees) from a type 316 stainless steel tube (5 inches long×0.06 inches diameter×0.0085 wall thickness) by reducing the wall thickness by approximately 20 percent (to approximately 0.0065 inches—requiring a groove in the flat stock 0.09 inches wide×0.0130 inches deep). The yield point of this spring increased from 92,000 psig to 135,000 psig.].

What is claimed is:

1. A spring assembly for a gauge comprising:
    a hollow metal tube adapted to change in volume in response to differential pressures applied across the walls thereof, said tube having
    a neck portion adapted to be connected to a fitting of the gauge,
    a body portion connected at one end to said neck portion, the walls of said body portion being cold worked to a reduced thickness to thereby increase the yield point thereof to a spring temper, and the other end of said body portion being sealed,
    the interior of said neck portion adapted to be in pressure communication with the fitting, and the interior of said body portion adapted to be in pressure communication through its unsealed end with the interior of said neck portion,
    whereby a change in the pressure applied to the fitting is communicated to the interior of said body portion changing the differential pressure across the walls of said body portion and causing a corresponding change in the volume thereof, the increased yield point of the cold worked walls of said body portion providing improved resistance of said spring to cracking, fatigue, and permanent deformation of said tube otherwise caused by said changing pressure.

2. The spring assembly of claim 1 wherein the reduced cold worked walls of said body portion are thinner than the walls of said neck portion.

3. The spring assembly of claim 2 wherein the reduced cold worked walls of said body portion are at least 20 percent thinner than the walls of said neck portion.

4. The spring assembly of claim 1 wherein the walls of said tube are cold worked to a reduced thickness no greater than 80 percent of their original thickness.

5. The spring assembly of claim 1 wherein said tube is stainless steel.

6. The spring assembly of claim 5 wherein said tube is type 316 stainless steel.

7. The spring assembly of claim 5 wherein said tube is thin-walled stainless steel.

8. The spring assembly of claim 7 wherein the walls of said tube are on the order of 0.003 inches thick.

9. The spring assembly of claim 1 wherein the cold worked walls of said body portion are reduced to a substantially uniform thickness transversely of said tube.

10. The spring assembly of claim 1 wherein the entire body portion of said tube is cold worked a substantially uniform amount.

11. The spring assembly of claim 1 wherein said body portion is flattened transversely and coiled longitudinally forming a helix.

12. The spring assembly of claim 1 wherein said sealed end is sealed by a solder bead.

13. The spring assembly of claim 12 wherein said tube further comprises:

a nose portion connected to said sealed end of said body portion and adapted to receive said solder bead.

14. The spring assembly of claim 13 further comprising:
   a pointer connected to said nose portion by said solder bead.

15. In a gauge for measuring pressure and the like comprising:
   a base portion,
   a fitting having a bore axially therethrough mounted in said base portion, and
   a spring assembly mounted in the bore of said fitting,
   the improvement wherein said spring assembly comprises a hollow metal tube adapted to change in volume in response to differential pressures applied across the walls thereof, the walls of said tube being cold worked to a reduced thickness to thereby increase the yield point thereof to a spring temper, the inside of said tube being in pressure communication through one end of said tube with the bore of said fitting, the other end of said tube being sealed and being free to move with respect to said base portion when said tube changes in volume,
   whereby a change in pressure applied to said fitting is communicated to the inside of said tube causing the volume of said tube to change and the free end of said tube to move with respect to said base, said cold worked walls of said tube enabling said spring assembly to resist cracking and permanent deformation otherwise caused by said changing pressure.

16. The gauge of claim 15 wherein said tube further comprises:
   a neck portion connected to said fitting, and
   a body portion connected at one end to said neck portion, the walls of said body portion being cold worked to a spring temper.

17. The gauge of claim 15 wherein the cold worked walls of said body portion are thinner than the walls of said neck portion.

18. The gauge of claim 15 wherein said tube is thin-walled stainless steel.

19. The gauge of claim 18 wherein said tube is type 316 stainless steel.

20. The gauge of claim 15 wherein the walls of said tube are 0.003 to 0.0085 inches thick.

21. The gauge of claim 15 wherein said base portion has indicia on the face thereof, and said spring assembly further comprises:
   a pointer on said free end of said tube,
   whereby when said free end of said tube moves with respect to said base, said pointer moves with respect to said indicia.

22. The gauge of claim 15 or 21 wherein said tube is coiled longitudinally forming a helix, said free end of said tube moving in an arcuate path when the volume of said tube changes.

* * * * *

UNITED STATES PATENT AND TRADEMARK OFFICE
CERTIFICATE OF CORRECTION

PATENT NO. : 4,191,056
DATED : March 4, 1980
INVENTOR(S) : Edward S. Holden

It is certified that error appears in the above-identified patent and that said Letters Patent are hereby corrected as shown below:

Column 2, line 28, "its" is changed to --it--.

Column 3, line 18, "sequeezed" is changed to --squeezed--.

Column 3, line 30, "would" is changed to --wound--.

Column 3, line 67, "reqire" is changed to --require--.

Signed and Sealed this

Tenth Day of June 1980

[SEAL]

Attest:

SIDNEY A. DIAMOND

Attesting Officer    Commissioner of Patents and Trademarks